United States Patent
Huang

(10) Patent No.: US 10,043,467 B2
(45) Date of Patent: Aug. 7, 2018

(54) CONTROL CIRCUIT AND DISPLAY DEVICE INCLUDING THE SAME

(71) Applicant: Shenzhen China Star Optoelectronics Technology Co., Ltd., Shenzhen, Guangdong (CN)

(72) Inventor: Xiaoyu Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 200 days.

(21) Appl. No.: 15/118,874

(22) PCT Filed: Jun. 21, 2016

(86) PCT No.: PCT/CN2016/086635
§ 371 (c)(1),
(2) Date: Aug. 13, 2016

(87) PCT Pub. No.: WO2017/201778
PCT Pub. Date: Nov. 30, 2017

(65) Prior Publication Data
US 2018/0114496 A1   Apr. 26, 2018

(30) Foreign Application Priority Data

May 26, 2016   (CN) .......................... 2016 1 0356996

(51) Int. Cl.
G09G 3/36   (2006.01)
G02F 1/13   (2006.01)
G02F 1/1345   (2006.01)

(52) U.S. Cl.
CPC ....... *G09G 3/3648* (2013.01); *G02F 1/13452* (2013.01); *G02F 1/13458* (2013.01)

(58) Field of Classification Search
CPC .. G02F 1/13452; G02F 1/3458; G09G 3/3648
See application file for complete search history.

(56) References Cited

U.S. PATENT DOCUMENTS

| | | | |
|---|---|---|---|
| 2008/0001895 A1* | 1/2008 | Choi ................ | G09G 3/3648 345/98 |
| 2009/0303224 A1* | 12/2009 | Yoshida ............ | G09G 3/3648 345/213 |
| 2015/0035817 A1* | 2/2015 | Hwang ............. | G09G 3/20 345/212 |

* cited by examiner

*Primary Examiner* — Kevin M Nguyen
(74) *Attorney, Agent, or Firm* — Andrew C. Cheng

(57) ABSTRACT

The control circuit includes a PCB and a timing control board having a first connection terminal, a switch, and an operation circuit. The first connection terminal is connected to a control terminal of the switch turning on and off the switch. An input terminal of the switch has a first voltage and an output terminal is connected to the operation circuit. The PCB includes sequentially positioned second, third, and fourth connection terminals. The third connection terminal has a voltage different from those on the second and fourth terminals. When the first connection terminal is connected to the third connection terminal, the switch is turned on, the output terminal has the first voltage, and the operation circuit is powered to function. When the first connection terminal is connected to the other connection terminals, the switch is turned off, the output terminal has zero voltage, and the operation circuit stops to function.

18 Claims, 1 Drawing Sheet

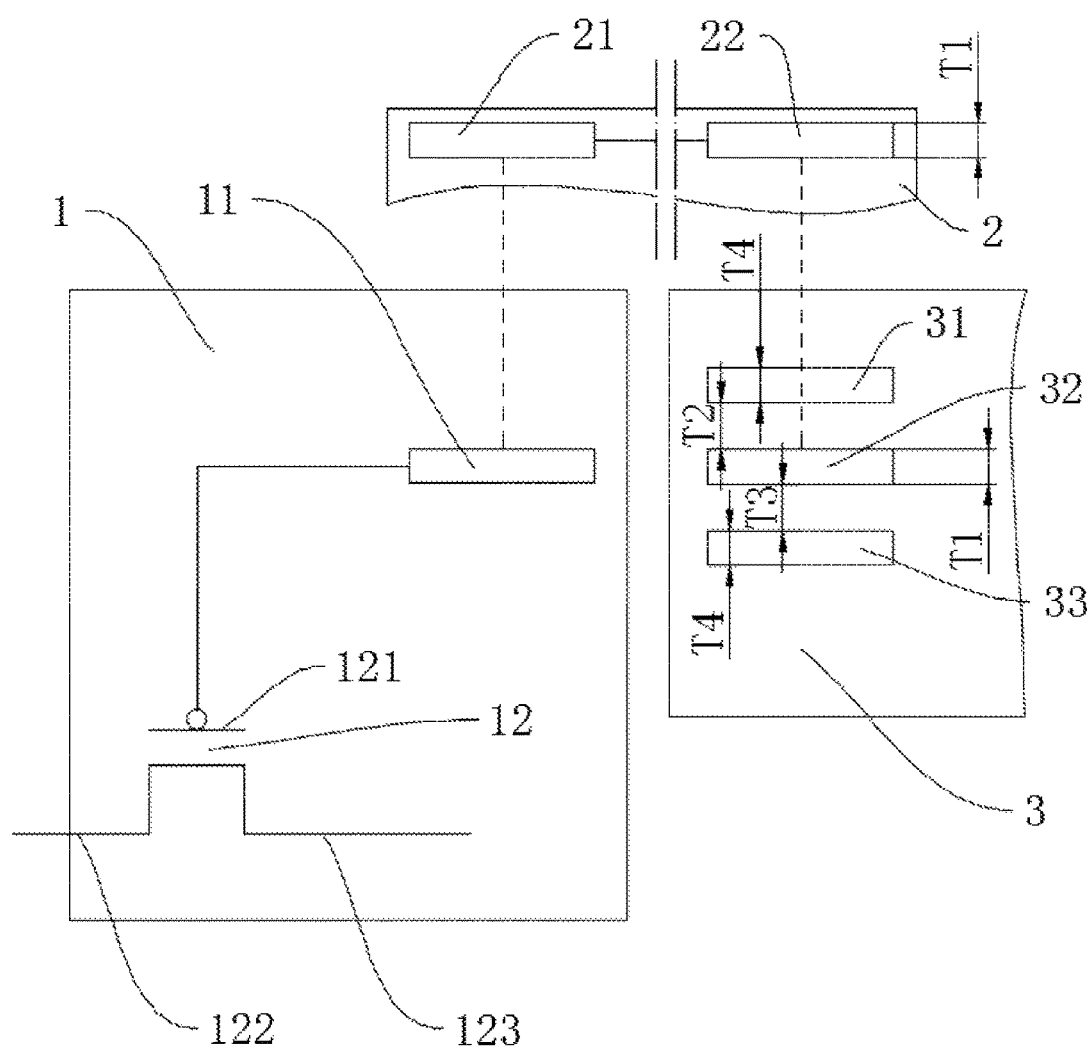

CONTROL CIRCUIT AND DISPLAY DEVICE INCLUDING THE SAME

CROSS REFERENCE

This application claims the priority of Chinese Patent Application No. 201610356996.9, entitled "Control circuit and display device including the same", filed on May 26, 2016, the disclosure of which is incorporated herein by reference in its entirety.

FIELD OF THE INVENTION

The present disclosure relates to display technologies, and more particularly to a control circuit and a display device employing the control circuit.

BACKGROUND OF THE INVENTION

Thin Film Transistor Liquid Crystal Display (TFT-LCD) is a major type of panel display and has become the main stream display for IT and video products. For a TFT-LCD, R/G/B signals, control signals, and power are passed to a timing control board. After being processed by a timing controller (TCON) IC on the timing control board, they are passed to the Source-Chip on Film (S-COF) and Gate-Chip on Film (G-COF) through printed circuit board (PCB). The S-COF and G-COF are connected to the display area of the TFT-LCD so that the TFT-LCD receives the required power and signals.

The timing control board and the PCB are usually connected through, for example, flexible flat cables (FFCs). During the assembly process, it is not uncommon that FFCs are not corrected properly so that the timing control board is damaged.

SUMMARY OF THE INVENTION

The technical issue to be addressed by the present disclosure is to provide a control circuit so that an operation circuit of the timing control board is not burnt down when the timing control board is not properly connected.

The present disclosure also teaches a display device employing the control circuit.

To achieve the objective, the present disclosure discloses the following technical solution.

A control circuit is provided that includes a timing control board having an operation circuit and a printed circuit board (PCB).

The timing control board further includes a first connection terminal and a switch. The first connection terminal is connected to a control terminal of the switch controlling and turning on and off the switch. An input terminal of the switch has a first voltage and an output terminal of the switch is connected to the operation circuit.

The PCB includes sequentially positioned second connection terminal, third connection terminal, and fourth connection terminal. The third connection terminal has a voltage different from those on the second and fourth terminals.

The first connection terminal is connected to any one of the second, third, and fourth connection terminals.

When the first connection terminal is connected to the third connection terminal, the switch is turned on, the output terminal has the first voltage, and the operation circuit of the timing control board is powered to function. When the first connection terminal is connected to the second or fourth terminal, the switch is turned off, the output terminal has zero voltage, and the operation circuit of the timing control board stops to function.

The switch is a metal oxide semiconductor (MOS) field effect transistor (FET).

In one embodiment, the switch is a P-type MOS (P-MOS) FET. The third connection terminal has a second voltage. The second and fourth connection terminals have a third voltage. The second voltage is less than the third voltage.

The second voltage is zero voltage or a negative voltage, and the third voltage is greater than or equal to 3V.

Alternatively, the switch is an N-type MOS (N-MOS) FET. The third connection terminal has a second voltage. The second and fourth connection terminals have a third voltage. The second voltage is greater than the third voltage.

The second voltage is greater than or equal to 3V, and the third voltage is zero voltage or a negative voltage.

The control circuit further includes a flexible flat cable (FFC). The FFC includes oppositely positioned first and second terminals. The first terminal is connected to the first connection terminal. The second terminal is connected to one of the second, third, and fourth connection terminals. The second terminal, and the second, third, and fourth connection terminals are rectangular gold fingers. The second terminal and the third connection terminal have a first width. A distance between the second and third connection terminals and a distance between the third and fourth connection terminals are identical to the first width.

The width of the second terminal and the width of the fourth connection terminal both are greater than or equal to the first width.

A ratio of the width of the second terminal to the first width, and a ratio of the width of the fourth connection terminal to the first width both are greater than or equal to 1.5.

The present disclosure also teaches a display device including an above-described control circuit.

Compared to the prior art, the present disclosure has the following advantages.

The control circuit of the present disclosure is able to ensure that the operation circuit functions or stops to function when the timing control board and the PCB are properly or wrongly connected so as to avoid short circuit and burning down.

BRIEF DESCRIPTION OF THE DRAWINGS

In order to more clearly illustrate the embodiments of the present disclosure or prior art, the following figures will be described in the embodiments are briefly introduced. It is obvious that the drawings are merely some embodiments of the present disclosure, those of ordinary skill in this field can obtain other figures according to these figures without paying the premise.

FIG. 1 is a schematic diagram showing a control circuit according to an embodiment of the present disclosure.

DETAILED DESCRIPTION OF PREFERRED EMBODIMENTS

Embodiments of the present disclosure are described in detail with the technical matters, structural features, achieved objects, and effects with reference to the accompanying drawings as follows. It is clear that the described embodiments are part of embodiments of the present disclosure, but not all embodiments. Based on the embodiments of the present disclosure, all other embodiments to those of ordinary skill in the premise of no creative efforts obtained, should be considered within the scope of protection of the present disclosure.

The following embodiments are described along with the accompanied drawings so as to exemplify the present disclosure. All directional terms such as "above," "below," "front," or "back," "left," "right," "in," "out," etc., are referred according to the orientation of the accompanied drawings. These terms are used to better and more clearly describe the present disclosure, and are not intended to specify or imply that the referred device or element should have a specific orientation, or should be structured or operated in a specific orientation. These terms therefore should not be interpreted as limitations to the preset disclosure.

In the present disclosure, unless otherwise specified, terms "configured," "connected," "joined," "positioned on . . ." should be interpreted broadly. For example, "connected" may mean "fixedly connected" or "detachably connected" or "integrally connected." "Connected" may also mean "mechanically connected," "directly connected," "connected through some intermediate medium," or "internally connected" between two objects. These terms should be interpreted in accordance with people of ordinary skill in the art.

In the present disclosure, unless otherwise specified, "multiple" means two or more. The term "process" specifies an independent process, or a part of a process that is indistinguishable from the process as long as the part achieves the desired effect. The present disclosure also uses "~" to denote a range of values where the numbers before and after "~" are included as the minimum and maximum values of the range. In the accompanied drawings, like or identical parts are denoted by same reference numbers.

As shown in FIG. 1, a control circuit according to an embodiment of the present disclosure includes a timing control board 1 and a printed circuit board (PCB) 3. The timing control board 1 includes a first connection terminal 11, a switch 12, and an operation circuit (not shown). The first connection terminal 11 is connected to a control terminal 121 of the switch 12. The control terminal 121 controls and turns on and off the switch 12. An input terminal 122 of the switch 12 has a first voltage V1 and an output terminal 123 of the switch 12 is connected to the operation circuit. The PCB 3 includes sequentially positioned second connection terminal 31, third connection terminal 32, and fourth connection terminal 33. The third connection terminal 32 has a voltage different from those on the second and fourth terminals 31 and 33. The first connection terminal 11 is connected to any one of the second, third, and fourth connection terminals 31, 32, and 33.

The control circuit may further include a flexible flat cable (FFC) 2, which includes oppositely positioned first and second terminals 21 and 22. The first terminal 21 is connected to the first connection terminal 11. The second terminal 22 is connected to one of the second, third, and fourth connection terminals 31, 32, and 33. As such, the first connection terminal 1 is electrically connected any one of the second, third, and fourth connection terminals 31, 32, and 33. When the first connection terminal 11 is connected to the third connection terminal 32, the FFC 2 is properly connected to the PCB 3 (i.e., the FFC 2 is not deviated). The switch 12 is therefore turned on, the output terminal 123 has the first voltage V1, and the operation circuit of the timing control board 1 is powered to function. When the first connection terminal 11 is connected to the second or fourth terminal 31 or 33, the FFC 2 not is properly connected to the PCB 3 (i.e., the FFC 2 is deviated). The switch 12 is turned off, the output terminal 123 has zero voltage, and the operation circuit of the timing control board stops to function. In other words, the control circuit is able to control the operation status of the operation circuit of the timing control board 1.

In the present embodiment, the PCB 3 has sequentially positioned second, third, and fourth connection terminals 31, 32, and 33. That is, the second and fourth terminals 31 and 33 are positioned at the third terminal 32's two sides, respectively. When the FFC 2 is connected to the PCB 3 and if the connection is proper, the first connection terminal 11 would be electrically connected to the third connection terminal 32. The timing control board 1 is then accurately connected to the PCB 3. The voltage on the third connection terminal 32 is passed to the control terminal 121 of the switch 12 through the first connection terminal 11, and the switch 12 is turned on. The output terminal 123 of the switch 12 would have the first voltage V1, and the operation circuit of the timing control board 1 is powered to function. If the FFC 2; s connection to the PCB 3 is deviated, the first connection terminal 11 would be wrongly and electrically connected to the first or the third connection terminal 31 or 33. The voltage on the first or the third connection terminal 31 or 33 is passed to the control terminal 121 of the switch 12 through the first connection terminal 11, and the switch 12 is turned off. The output terminal 123 of the switch 12 would have zero voltage, and the operation circuit of the timing control board 1 stops to function, thereby avoiding short circuit and burning down. In short, the control circuit of the present disclosure ensures that the operation circuit on the timing control board 1 to function only when the FFC 2 is properly connected to the PCB 3, and that he operation circuit stops when the FFC is wrongly connected to the PCB 3. As such the operation circuit is prevented from burning down due to short circuit.

Alternative embodiments of the control circuit may adopt different connection means to achieve electrical connection between the timing control board 1 (the first connection terminal 11) and the PCB 3 (the second, third, or fourth connection terminal 31, 32, or 33). Control circuits of these embodiment would also ensure that the operation circuit functions or stops to function when the connection means are properly or wrongly applied so as to avoid short circuit and burning down.

The term "a connection terminal" may have various embodiments such as a pad, a lead, a gold finger, a probe, etc.

Specifically, the switch 2 may be a field effect transistor (FET), a thin-film transistor (TFT), or a metal oxide semiconductor (MOS) FET, that is small yet responsive.

In one embodiment, the switch 12 is a P-type MOS (P-MOS) FET, the third connection terminal 32 has a second voltage V2, the first and fourth connection terminals 31 and 33 has a third voltage V3. The second voltage V2 is less than the third voltage V3. Assuming that the P-MOS FET has a turn-on voltage V0, the second and the first voltages V2 and V1 has a voltage difference V21, and the third and the first voltages V3 and V1 has a voltage difference V31, the switch 12 is turned on when V21<V0, and the switch 12 is turned off when V31>V0.

Preferably, the second voltage V2 is a zero or negative voltage. The third voltage V3 is greater than or equal to 3V. For example, the second voltage V2 is zero voltage (e.g., grounded), and the third voltage V3 is 3.3V.

In another embodiment, the switch 12 is a N-type MOS (N-MOS) FET, the third connection terminal 32 has a second voltage V2, the first and fourth connection terminals 31 and 33 has a third voltage V3. The second voltage V2 is greater than the third voltage V3. Assuming that the N-MOS FET has a turn-on voltage V0, the second and the first voltages V2 and V1 has a voltage difference V21, and the third and the first voltages V3 and V1 has a voltage difference V31, the switch 12 is turned on when V21>V0, and the switch 12 is turned off when V31<V0.

Preferably, the second voltage V2 is greater than or equal to 3V. The third voltage V3 is a zero or negative voltage. For example, the second voltage V2 is 3.3V, and the third voltage V3 is zero voltage (e.g., grounded).

As shown in FIG. 1, the second terminal 22, and the second, third, and fourth connection terminals 31, 32, and 33 in the present embodiment are rectangular gold fingers. The second terminal 22 and the third connection terminal 32 have a first width T1. A distance T2 between the second and third connection terminals 31 and 32, and a distance T3 between the third and fourth connection terminals 32 and 33 are identical to T1. As such, when the second terminal 22 is connected to the PCB 3, even when the FFC 2 is deviated, the second terminal 22 would be connected to only one of the second, third, and fourth connection terminals 31, 32, and 33. No short circuit would occur among the second, third, and fourth connection terminals 31, 32, and 33. The second terminal 22 also would not be connected to the gap between the second and third connection terminals 31 and 32, or to the gap between the third and fourth connection terminals 32 and 33, further reducing the risk of burning down the operation circuit of the timing control board 1.

Furthermore, to prevent that the second terminal 22 is deviated too farther away from the third connection terminal 32, the second and fourth connection terminals 31 and 33 have a width T4 greater than or equal to the first width T1 so that the second terminal 22 would always be connected to one of the second, third, or fourth connection terminal 31, 32, or 33.

For example, in one embodiment, a ratio of T4 to T1 is greater than 1.5.

The present disclosure also teaches a display device including the above-described control circuit ensuring that the operation circuit on the timing control board functions or stops to function when the timing control board 1 and the PCB 3 are properly or wrongly connected so as to avoid short circuit and burning down.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A control circuit comprising a timing control board having an operation circuit and a printed circuit board (PCB) wherein
   the timing control board further comprises a first connection terminal and a switch; the first connection terminal is connected to a control terminal of the switch controlling and turning on and off the switch; an input terminal of the switch has a first voltage and an output terminal of the switch is connected to the operation circuit;
   the PCB comprises sequentially positioned second connection terminal, third connection terminal, and fourth connection terminal; the third connection terminal has a voltage different from those on the second and fourth terminals;
   the first connection terminal is connected to any one of the second, third, and fourth connection terminals;
   when the first connection terminal is connected to the third connection terminal, the switch is turned on, the output terminal has the first voltage, and the operation circuit of the timing control board is powered to function; and
   when the first connection terminal is connected to the second or fourth connection terminal, the switch is turned off, the output terminal has zero voltage, and the operation circuit of the timing control board stops to function.

2. The control circuit according to claim 1, wherein the switch is a metal oxide semiconductor (MOS) field effect transistor (FET).

3. The control circuit according to claim 2, wherein the switch is a P-type MOS (P-MOS) FET; the third connection terminal has a second voltage; the second and fourth connection terminals have a third voltage; and the second voltage is less than the third voltage.

4. The control circuit according to claim 3, wherein the second voltage is zero voltage or a negative voltage; and the third voltage is greater than or equal to 3V.

5. The control circuit according to claim 2, wherein the switch is a N-type MOS (N-MOS) FET; the third connection terminal has a second voltage; the second and fourth connection terminals have a third voltage; and the second voltage is greater than the third voltage.

6. The control circuit according to claim 5, wherein the second voltage is greater than or equal to 3V; and the third voltage is zero voltage or a negative voltage.

7. The control circuit according to claim 1, further comprising a flexible flat cable (FFC) wherein the FFC comprises oppositely positioned first and second terminals; the first terminal is connected to the first connection terminal; the second terminal is connected to one of the second, third, and fourth connection terminals; the second terminal, and the second, third, and fourth connection terminals are rectangular gold fingers; the second terminal and the third connection terminal have a first width; a distance between the second and third connection terminals and a distance between the third and fourth connection terminals are identical to the first width.

8. The control circuit according to claim 7, wherein the width of the second terminal and the width of the fourth connection terminal both are greater than or equal to the first width.

9. The control circuit according to claim 7, wherein a ratio of the width of the second terminal to the first width, and a ratio of the width of the fourth connection terminal to the first width both are greater than or equal to 1.5.

10. A display device comprising a control circuit wherein the control circuit comprises a timing control board having an operation circuit and a printed circuit board (PCB);
    the timing control board further comprises a first connection terminal and a switch; the first connection terminal is connected to a control terminal of the switch controlling and turning on and off the switch; an input terminal of the switch has a first voltage and an output terminal of the switch is connected to the operation circuit;
    the PCB comprises sequentially positioned second connection terminal, third connection terminal, and fourth connection terminal; the third connection terminal has a voltage different from those on the second and fourth terminals;

the first connection terminal is connected to any one of the second, third, and fourth connection terminals;

when the first connection terminal is connected to the third connection terminal, the switch is turned on, the output terminal has the first voltage, and the operation circuit of the timing control board is powered to function; and when the first connection terminal is connected to the second or fourth connection terminal, the switch is turned off, the output terminal has zero voltage, and the operation circuit of the timing control board stops to function.

11. The display device according to claim 10, wherein the switch is a metal oxide semiconductor (MOS) field effect transistor (FET).

12. The display device according to claim 11, wherein the switch is a P-type MOS (P-MOS) FET; the third connection terminal has a second voltage; the second and fourth connection terminals have a third voltage; and the second voltage is less than the third voltage.

13. The display device according to claim 12, wherein the second voltage is zero voltage or a negative voltage; and the third voltage is greater than or equal to 3V.

14. The display device according to claim 13, wherein the switch is a N-type MOS (N-MOS) FET; the third connection terminal has a second voltage; the second and fourth connection terminals have a third voltage; and the second voltage is greater than the third voltage.

15. The display device according to claim 14, wherein the second voltage is greater than or equal to 3V; and the third voltage is zero voltage or a negative voltage.

16. The display device according to claim 10, further comprising a flexible flat cable (FFC) wherein the FFC comprises oppositely positioned first and second terminals; the first terminal is connected to the first connection terminal; the second terminal is connected to one of the second, third, and fourth connection terminals; the second terminal, and the second, third, and fourth connection terminals are rectangular gold fingers; the second terminal and the third connection terminal have a first width; and a distance between the second and third connection terminals and a distance between the third and fourth connection terminals are identical to the first width.

17. The display device according to claim 16, wherein the width of the second terminal and the width of the fourth connection terminal are both greater than or equal to the first width.

18. The display device according to claim 16, wherein a ratio of the width of the second terminal to the first width, and a ratio of the width of the fourth connection terminal to the first width are both greater than or equal to 1.5.

* * * * *